Figure 1:
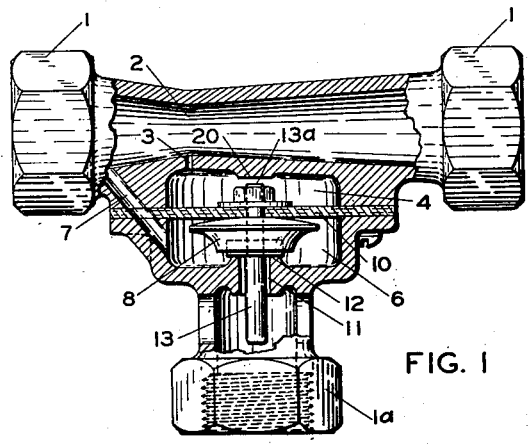
Figure 2:
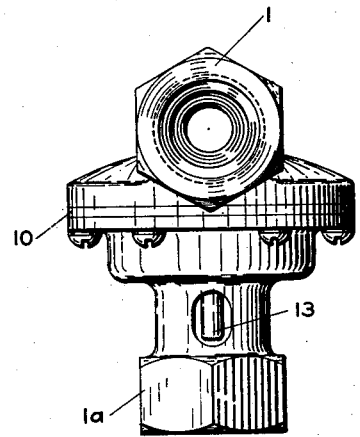
Figure 3:
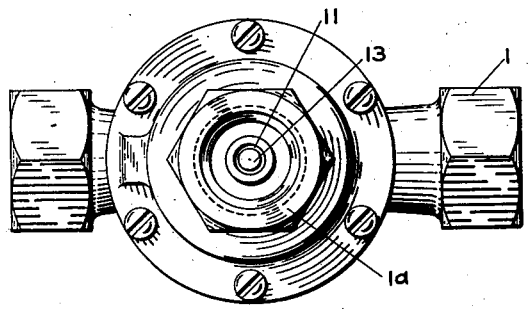

Oct. 19, 1937.   G. F. McDOUGALL   2,096,125
SAMPLING VALVE
Filed May 11, 1937

INVENTOR
George F McDougall

Patented Oct. 19, 1937

2,096,125

UNITED STATES PATENT OFFICE 2,096,125

SAMPLING VALVE

George F. McDougall, Portland, Oreg.

Application May 11, 1937, Serial No. 141,946

14 Claims. (Cl. 182—12)

This invention relates to sampling valves, sometimes called trap primers, though the latter designation does not compass their usefulness. Among the earliest sampling valves is the Ericcson Patent No. 815,691 and later there is the patent to Goss, No. 1,799,826, and others subsequent.

All of the art samplers with the exception of that disclosed in my co-pending application, Serial No. 137,508, employ a body within which is a piston-like movable member actuated by flow through the body to lift a small valve from its seat and permit the emission of a small quantity or sample of the flow to a branch pipe.

The principal object of my invention is a sampler that omits this movable member and having no movable part in the main flow passageway is much less subject to disarrangement and clogging by scale, rust and obstructions between the rather closely fitting movable and stationary parts of the known art. It will also drain back as freely as the pipe line within which it is inserted, which is important.

Another object is a device of the character indicated that employs the well-known ability of a Venturi tube to change pressure to velocity and velocity back to pressure without material loss of head, whereby a Venturi pressure difference is provided for working a valve to a branch pipe with minimum of reduction of pressure in the main line.

A still further object is a sampler that will not open the valve to the branch line unless the master valve has been definitely opened and a flow velocity established so that waste from a leaky faucet is not aggravated by waste to a branch line, opened under influence of a small leak.

These and other objects that will be particularly explained in this specification and pointed out in the claims constitute the purpose of this invention.

The invention herein consists in employing the Venturi tube to vary pressures on a diaphragm, or its equivalent, responsive to flow and stopping, the movement thus induced being employed to control valves governing flow from a branch outlet in the several ways herein shown and deducible therefrom.

This present invention is related to the one disclosed in my co-pending application for Primer valves, Serial No. 137,508, filed April 17, 1937, with some essential differences. First, it uses a Venturi tube with the well known piezometer opening instead of a pair of ejector nozzles, in the interest of lowered manufacturing cost.

Since one of the most important uses of an instrument of this character is for trap priming, the invention has been embodied in this form for the purpose of explaining the principle thereof in the drawing and the specification associated therewith.

In the drawing,—

Fig. I is a longitudinal view of my new trap primer, sectioned to disclose its operative instrumentalities, in the same position that it would occupy in a water supply line, assuming that flow was from left to right;

Fig. II is a right hand end view, in orthographic projection, of Fig. I;

Fig. III is a bottom view of Fig. I in projection.

In further detailed description of the drawing, I is a body for insertion in a water supply line, with the direction of flow from left to right. The body I includes a Venturi tube 2 of the meter type, that is a part of the flow channel to a master fixture such as a kitchen sink, 3 is a piezometer hole at the point of lowest pressure and highest velocity in the Venturi tube, when flow is passing through it, and 4 is a chamber positioned to be under the influence of varying pressures in the Venturi tube by way of the hole 3. 10 is a flexible diaphragm comprising a common wall between the chamber 4 and another chamber called the pressure chamber, designated by the numeral 6.

Under no flow conditions, water pressure will be communicated to the chamber 4 through the hole 3 and to the pressure chamber through the conduit 7, which is in communication with the water supply line at either end of the Venturi tube 2 though it is shown at the left hand end, and under the conditions illustrated in Fig. I with water pressure in the line and no flow, pressures in chambers 4 and 6 will be identical.

A valve 8 is shown to be attached to and movable with the flexible diaphragm 10 to control the annular opening 11 through the valve seat 12, that is partially filled by the valve stem 13. The valve 8 will normally remain seated under no flow conditions due to the unbalanced area of this annular opening, or a bit of the initial resilient springing ability of the flexible diaphragm may be used to positively seat it.

An intermediate opening in the body I is designated by the trap pipe connection 1a and the water emitted through the annular opening 11 will flow by gravity to a trap to be primed, through a suitable pipe that is not shown.

The operation of this device is obvious. As soon as a master fixture faucet is opened sufficiently to establish a flow of any considerable amount through the Venturi tube 2, the pressure in chamber 4 will drop considerably below the pressure in the valve chamber 6, hence the diaphragm 10 is unbalanced and will lift the valve 8 off the seat 12 and a restricted amount of water will be admitted to the trap pipe by way of the trap pipe connection 1a.

When flow ceases, pressure will quite rapidly equalize in the chambers 4 and 6, if the conduit 7 is of greater capacity than the annular space 11 as it should be, hence the valve 8 will again seat on the valve seat 12 and flow to the trap pipe will await another opening of the master fixture, when flow, restricted only by the carrying capacity of the annular opening 11, will be resumed.

For best results the conduit 7 should be several times the area of the annular opening 11.

In Fig. I, the stem 13 is shown screwed up at 13a to co-operate with the stop 20, to limit the movement of the diaphragm 10.

Having disclosed my invention so that anyone skilled in hydromechanics can fully understand it and be able to make use of it, what I claim as new and desire to secure by Letters Patent, is,—

1. A sampling valve comprising a body, a chamber formed in part in said body, one wall of which is a fluid tight diaphragm member, a Venturi tube positioned adjacent said chamber to lower the pressure therein under the influence of fluid flow through the tube, to cause a movement of the diaphragm and means positioned to be controlled by movements of the diaphragm to extract a measured amount of fluid from the supply line when flow occurs through said supply line and to deliver the same to a branch pipe.

2. A sampling valve comprising a body, a chamber formed in said body, one wall of which is a fluid tight diaphragm member, a Venturi tube positioned adjacent said chamber to lower the pressure under the influence of fluid flow through the tube to cause a yielding of the diaphragm and valve means positioned to be actuated by yielding of the diaphragm to extract a restricted amount of fluid from the supply line when flow occurs through said supply line and to deliver the same to a branch pipe.

3. A sampling valve comprising a body for insertion in a water supply line, a chamber associated with said body, one wall of which is a diaphragm, a Venturi tube positioned to move the diaphragm by varying the pressure in the chamber under influence of flow through said tube, an intermediate outlet from said body, a conduit positioned to convey water therefrom and valve control means operable by movement of the diaphragm to control the amount of flow from said intermediate outlet.

4. A sampling valve comprising a body for insertion in a fluid supply line, a chamber formed in part within said body, one wall of which is a diaphragm, a Venturi tube positioned to move the diaphragm by varying the pressure in the chamber under influence of flow through said tube, an intermediate outlet from said body, a conduit positioned to convey water therefrom and valve control means operable by movement of the diaphragm to determine the timing of flow from said intermediate outlet.

5. A sampling valve for insertion in a water supply line comprising a body within which is a chamber, a flexible diaphragm forming a wall of said chamber, a Venturi tube in the chamber positioned to affect the diaphragm responsive to flow, a sampling mechanism associated with said body and valve means for controlling said sampling mechanism that are controlled by said diaphragm.

6. A sampling valve defined in part as a body having a chamber therein, a diaphragm comprising a wall of the chamber, a sampling device associated with said body, a Venturi tube associated with said chamber that is effective to flex the diaphragm and valve means for controlling the sampling device that are responsive to flexing of the diaphragm.

7. A flow control structure comprising a body containing a chamber that is insertible in a fluid supply line, a Venturi tube adjacent the chamber that forms a part of the fluid passageway, a diaphragm positioned to be responsive to varying pressures in the chamber when influenced by the Venturi tube and a valve system associated with the diaphragm that is effective to control separate fluid flow devices under the influence of movement of the diaphragm.

8. In a primer valve, a body that contains a chamber for insertion in a water supply line, a wall member of said chamber that is movable under influence of varying pressures in the chamber, a Venturi tube structure comprising a part of the flow channel through the body that is arranged to vary the pressure in the chamber by Venturi action due to water flow through said body, a trap pipe associated with said body and valve means operable by movement of said movable wall that are effective to control water supply to said trap pipe.

9. In a sampling valve, a body that contains a chamber for insertion in a fluid supply line, a yieldable wall of said chamber that is movable by Venturi pressure difference in the chamber, a Venturi tube comprising part of the flow channel through the body that is arranged to produce Venturi pressure difference in the chamber, a valve chamber positioned on the opposite side of the diaphragm, a conduit from the supply line to the valve chamber, an outlet from said valve chamber and a valve associated with the diaphragm that is effective to control said outlet.

10. In a sampling valve, a Venturi flow passageway, a chamber adjacent said passageway that is in part enclosed by a diaphragm, a piezometer opening between the chamber and the low pressure zone of the venturi, a pressure chamber positioned on the opposite side of the diaphragm, a sampling outlet formed in the pressure chamber and a normally closed diaphragm controlled valve for the sampling outlet.

11. In a sampling valve, a Venturi flow passageway, a chamber under the Venturi influence of said passageway that is in part bounded by a diaphragm, a pressure chamber on the opposite side of said diaphragm that contains a valved sampling outlet and operative connections between the valved outlet and the diaphragm.

12. In a sampling valve, a Venturi flow passageway, a chamber associated therewith under the venturi influence of said passageway that is in part bounded by a diaphragm, a pressure chamber associated with the first named chamber that has the said diaphragm as a common wall therebetween, a sampling port in said pressure chamber and a diaphragm controlled valve positioned to control said port.

13. In a sampling valve, a body for insertion in a fluid flow line, a branch flow line associated therewith, a chamber associated with said body, a yieldable wall in part defining the boundaries of said chamber, means for subjecting both sides of said wall to balanced fluid pressure, Venturi means responsive to flow through said body for unbalancing the pressure and valve means responsive to yielding of said wall that are effective to control the emission of fluid to a branch flow line.

14. A sampling valve defined in part as a body that contains a Venturi tube for insertion in a fluid flow line, an intermediate outlet for said body, valve means for controlling said outlet and means operable by Venturi pressure difference between flow and no flow through the body for controlling said valve means.

GEORGE F. McDOUGALL.